(12) United States Patent
Holmberg et al.

(10) Patent No.: US 9,752,410 B2
(45) Date of Patent: *Sep. 5, 2017

(54) FLAPPER STABILIZATION FOR BACK PRESSURE VALVE

(71) Applicant: THRU TUBING SOLUTIONS, INC., Oklahoma City, OK (US)

(72) Inventors: Aaron D. Holmberg, Oklahoma City, OK (US); Roger L. Schultz, Newcastle, OK (US)

(73) Assignee: Thru Tubing Solutions, Inc., Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/871,060

(22) Filed: Sep. 30, 2015

(65) Prior Publication Data

US 2016/0230503 A1 Aug. 11, 2016

Related U.S. Application Data

(63) Continuation of application No. 14/869,483, filed on Sep. 29, 2015.

(51) Int. Cl.
*E21B 34/10* (2006.01)
*F16K 1/18* (2006.01)
(Continued)

(52) U.S. Cl.
CPC ............... *E21B 34/10* (2013.01); *F16K 1/18* (2013.01); *F16K 15/03* (2013.01); *E21B 2034/005* (2013.01)

(58) Field of Classification Search
CPC .... E21B 34/10; E21B 2034/005; F16K 15/03; F16K 1/18
See application file for complete search history.

(56) References Cited

U.S. PATENT DOCUMENTS

| 2002/0148615 | A1 | 10/2002 | Szarka et al. |
| 2006/0011354 | A1* | 1/2006 | Logiudice ............. E21B 21/103 166/380 |

(Continued)

OTHER PUBLICATIONS

International Search Report and Written Opinion issued Sep. 25, 2015 for Application No. PCT/US15/14877, 13 pages.

(Continued)

*Primary Examiner* — George Gray
(74) *Attorney, Agent, or Firm* — Smith IP Services, P.C.

(57) ABSTRACT

A valve assembly with a longitudinal flow passage, a first longitudinal section of the flow passage having less flow area than a second longitudinal section of the flow passage, and a valve that permits flow in only one direction through the flow passage, the valve including a closure member. In an open position, the closure member can be disposed between the second flow passage section and a chamber in fluid communication with the first flow passage section. A method in which a valve assembly is connected in a tubular string, the valve assembly including a valve that permits flow in only one direction through a longitudinal flow passage of the valve assembly, and fluid is flowed in the one direction through the tubular string, thereby displacing a closure member of the valve to an open position and preventing displacement of the closure member toward a closed position.

13 Claims, 6 Drawing Sheets

(51) Int. Cl.
*F16K 15/03* (2006.01)
*E21B 34/00* (2006.01)

(56) References Cited

U.S. PATENT DOCUMENTS

| | | | |
|---|---|---|---|
| 2007/0000665 A1* | 1/2007 | Tudor | E21B 33/124 |
| | | | 166/305.1 |
| 2007/0137869 A1 | 6/2007 | MacDougall et al. | |
| 2009/0071654 A1 | 3/2009 | O'Malley et al. | |
| 2010/0294508 A1 | 11/2010 | Xu et al. | |
| 2014/0124212 A1* | 5/2014 | Slup | E21B 34/08 |
| | | | 166/373 |

OTHER PUBLICATIONS

Thru Tubing Solutions Inc., Product Catalog pp. 10-11, dated 2013, 2 pages.

* cited by examiner

FLAPPER STABILIZATION FOR BACK PRESSURE VALVE

CROSS-REFERENCE TO RELATED APPLICATIONS

This application is a continuation of U.S. application Ser. No. 14/869,483 filed 29 Sep. 2015, which claims priority under 35 USC §119 to International application serial no. PCT/US15/14877 filed 6 Feb. 2015. The entire disclosures of these prior applications are incorporated herein by this reference.

BACKGROUND

This disclosure relates generally to equipment utilized and operations performed in conjunction with fluid flow controls and, in one example described below, more particularly provides for flapper stabilization in coiled tubing back pressure valves.

Valves can be used for fluid flow control in well operations. For example, a back pressure valve can be connected in a coiled tubing string, in order to prevent well pressure from being communicated to surface via the coiled tubing string. Thus, it will be readily appreciated that improvements are continually needed in the arts of constructing and operating fluid flow control valves.

DETAILED DESCRIPTION

Figure 1:
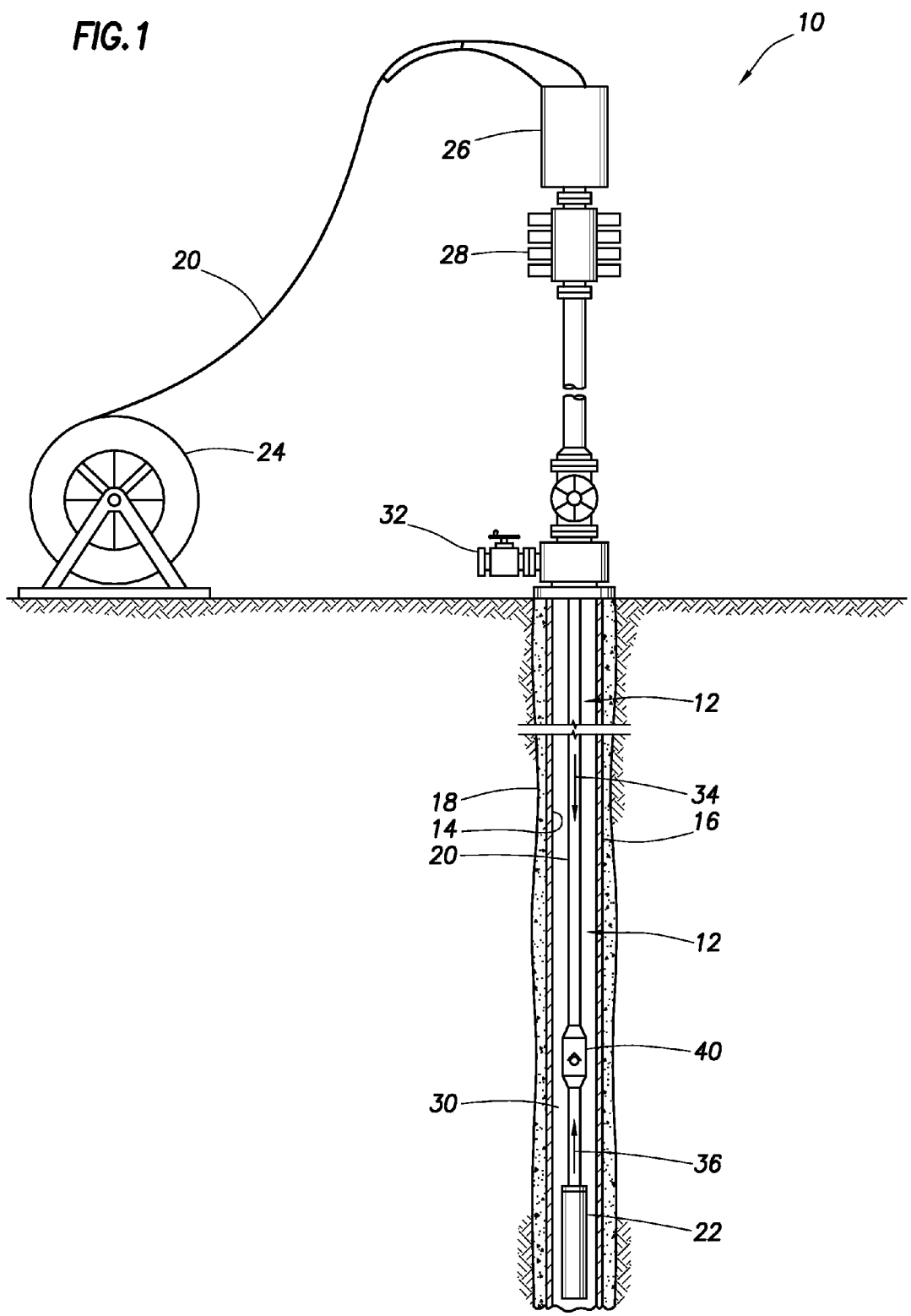
FIG. 1 is a representative partially cross-sectional view of a well system and associated method which can embody principles of this disclosure.

Representatively illustrated in FIG. 1 is a well system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is positioned in a wellbore 14 lined with casing 16 and cement 18. Although multiple casing strings would typically be used in actual practice, for clarity of illustration only one string of casing 16 is depicted in the drawings.

As used herein, the term "casing" is used to refer to a protective wellbore lining. Casing could be of the types known to those skilled in the art as casing, tubing or liner. Casing may be segmented or continuous. Casing may be pre-formed or formed in situ. Casing may be made of steel, other metals or alloys, polymers, composites, or any other material. The scope of this disclosure is not limited to use of any particular type of casing, or to use of casing at all.

As used herein, the term "cement" is used to refer to a material which hardens to secure and seal a casing in a wellbore. Cement does not necessarily comprise a cementitious material, since hardenable polymers or other materials may be used instead. Cement may harden due to hydration, passage of time, exposure to heat, exposure to a hardening agent, or due to any other stimulus. The scope of this disclosure is not limited to use of any particular type of cement, or to use of cement at all.

Although the wellbore 14 is illustrated as being vertical, sections of the wellbore could instead be horizontal or otherwise inclined relative to vertical. Although the wellbore 14 is completely cased and cemented as depicted in FIG. 1, any sections of the wellbore in which operations described in more detail below are performed could be uncased or open hole. Thus, the scope of this disclosure is not limited to any particular details of the system 10 and method.

The tubular string 12 of FIG. 1 comprises coiled tubing 20 and a bottom hole assembly (BHA) 22. As used herein, the term "coiled tubing" refers to a substantially continuous tubing that is stored on a spool or reel 24. The reel 24 could be mounted, for example, on a skid, a trailer, a floating vessel, a vehicle, etc., for transport to a wellsite. Although not shown in FIG. 1, a control room or cab would typically be provided with instrumentation, computers, controllers, recorders, etc., for controlling equipment such as an injector 26 and a blowout preventer stack 28.

When the tubular string 12 is positioned in the wellbore 14, an annulus 30 is formed radially between them. Fluid, slurries, etc., can be flowed from surface into the annulus 30 via, for example, a casing valve 32. One or more pumps (not shown) may be used for this purpose. Fluid can also be flowed to surface from the wellbore 14 via the annulus 30 and valve 32.

Fluid, slurries, etc., can also be flowed from surface into the wellbore 14 via the tubing 20 (e.g., in a direction indicated by arrow 34 in FIG. 1). However, in the FIG. 1 example, a valve assembly 40 connected in the tubular string 12 prevents fluid from flowing to surface from the wellbore 14 via the tubing 20.

The valve assembly 40 is, in this example, of the type known to those skilled in the art as a "back pressure" valve, since it prevents well pressure from being communicated to the surface via the coiled tubing 20. However, in other examples, the valve assembly 40 may not necessarily be a back pressure valve, and may not necessarily be connected in a coiled tubing string. Thus, it will be understood that the scope of this disclosure is not limited to any of the specific details of the valve assembly 40 or its use in the well system 10 of FIG. 1.

Figure 2:
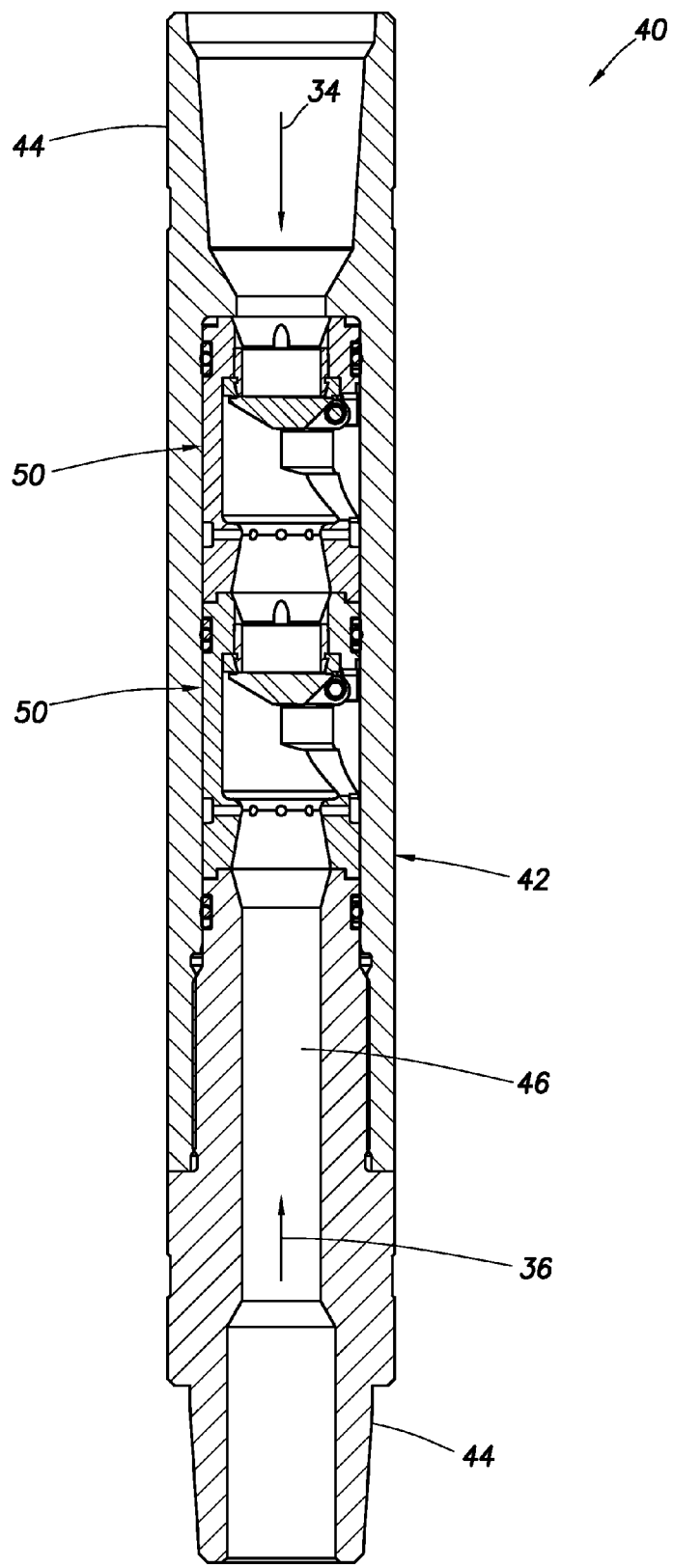
FIG. 2 is a representative enlarged scale cross-sectional view of a valve assembly that can embody the principles of this disclosure.

Referring additionally now to FIG. 2, an enlarged scale cross-sectional view of one example of the valve assembly 40 is representatively illustrated, apart from the remainder of the system 10 and method of FIG. 1. However, note that the valve assembly 40 may be used in other systems and methods, in keeping with the principles of this disclosure.

In the FIG. 2 example, the valve assembly 40 includes a housing assembly 42, with tubular string connectors 44 at opposite ends of the housing assembly. The connectors 44 are configured for threaded attachment to adjoining sections of the tubular string 12. Instead of threaded attachment, other connecting means (such as, quick connects, swaging, welds, etc.) may be used in other examples.

A flow passage 46 extends longitudinally through the valve assembly 40. When connected in the tubular string 12, the flow passage 46 forms a longitudinal section of a flow passage extending longitudinally through the coiled tubing 20 and certain other elements of the tubular string.

As depicted in FIG. 2, multiple valves 50 are contained in the housing assembly 42. However, in other examples, only a single valve 50 or other numbers of valves may be used, and the valve(s) are not necessarily contained within a separate housing assembly. Thus, the scope of this disclosure is not limited to any particular details of the valve(s) 50 described herein or depicted in the drawings.

Each of the valves 50 in the FIG. 2 example is operative to permit flow in one direction 34, but prevent flow in an opposite direction 36, through the passage 46. The use of multiple valves 50 provides redundancy.

The present inventors have determined that failures of prior back pressure valves are due, at least to a significant extent, to excessive movement of valve flappers as fluid flows through the valves. The fluid flow causes a flapper to pivot toward an open position against a biasing force exerted by a spring. However, since the fluid flow is generally turbulent and the spring is continually acting to displace the flapper toward a closed position, the flapper is constantly reciprocating between the open and closed positions. This leads to valve damage, such as, fatigue failure of the spring and/or excessive wear of a flapper pivot or hinge.

The present inventors have further determined that it would be desirable to be able to maintain a closure member of a valve at an open position, thereby preventing the closure member from displacing toward a closed position, while fluid flows through the valve. By preventing displacement of the closure member toward the closed position, a useful life of the valve can be greatly extended (e.g., by preventing fatigue failure of a spring, by eliminating excessive wear, etc.).

Figure 3:
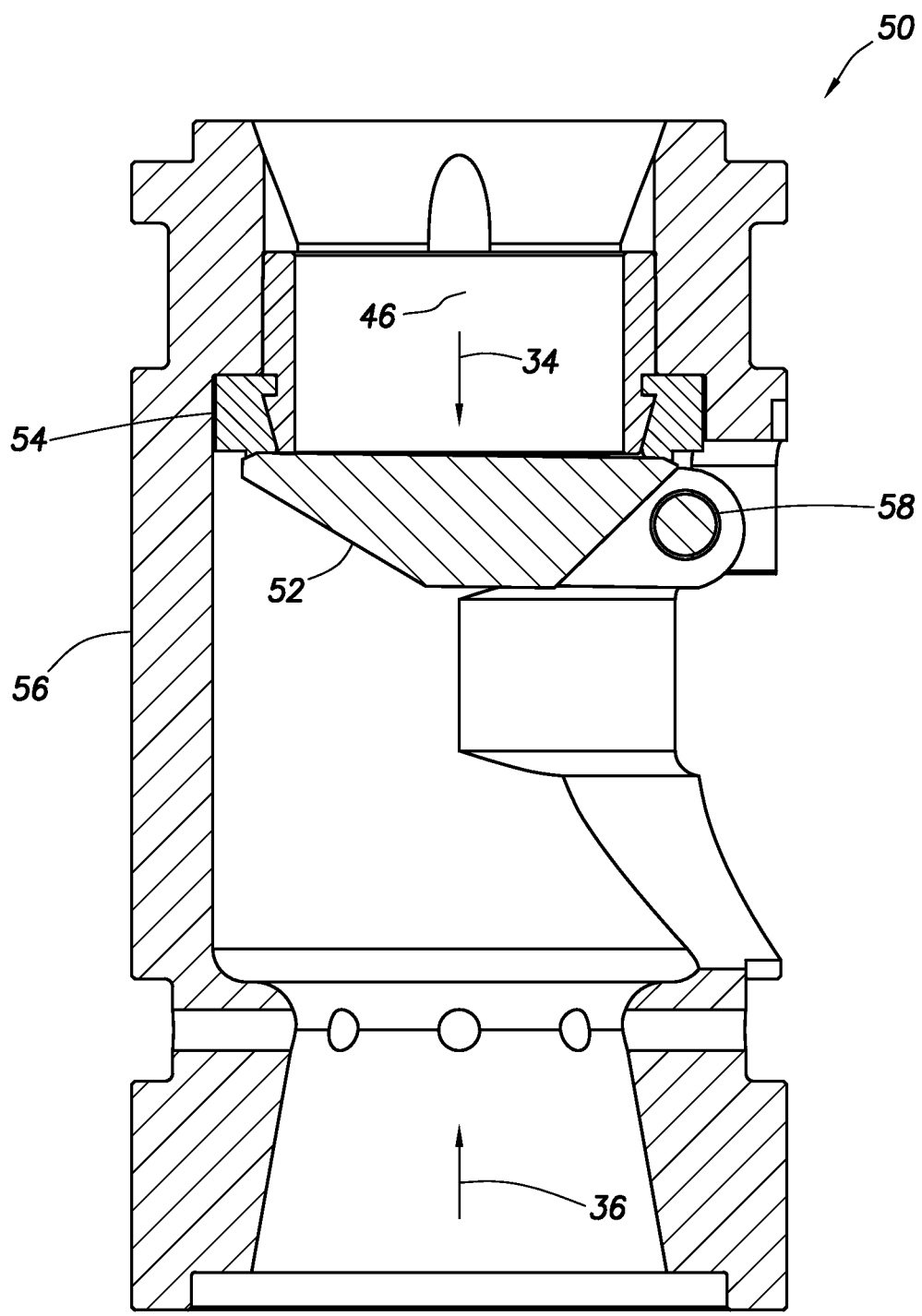
FIG. 3 is a representative further enlarged scale cross-sectional view of one example of a valve that can embody the principles of this disclosure, the valve being in a closed configuration.

Referring additionally now to FIG. 3, an enlarged scale cross-sectional view of an example of one of the valves 50 is representatively illustrated apart from the remainder of the valve assembly 40. Of course, the valve 50 may be used in other valve assemblies, in keeping with the principles of this disclosure.

In the FIG. 3 example, the valve 50 is in a closed configuration. A closure member 52 of the valve 50 sealingly engages an annular valve seat 54 and thereby prevents flow through the passage 46. The closure member 52 can be biased toward this closed position by a spring or other biasing device (such as, a torsion spring, a beam-type spring, a resilient elastomer material, etc., not shown).

The closure member 52 is depicted in the FIG. 3 example as comprising a flapper. The flapper is pivotably mounted relative to a body 56 of the valve 50 by means of a pivot or hinge 58. However, in other examples, other types of closure members may be used (such as, sleeves, plugs, gates, etc.), which are not necessarily pivotably mounted. Thus, the scope of this disclosure is not limited to any particular details of the valve 50 as described herein or depicted in the drawings.

In this closed position, flow in the direction 36 (upward as viewed in FIG. 3) is prevented by the sealing engagement between the closure member 52 and the seat 54. Flow in the direction 34 (downward as viewed in FIG. 3) will also be prevented, unless a sufficient pressure differential is created across the closure member 52 to overcome the biasing force exerted by the spring or other biasing device, which will cause the closure member to pivot out of sealing engagement with the seat 54.

Figure 4:
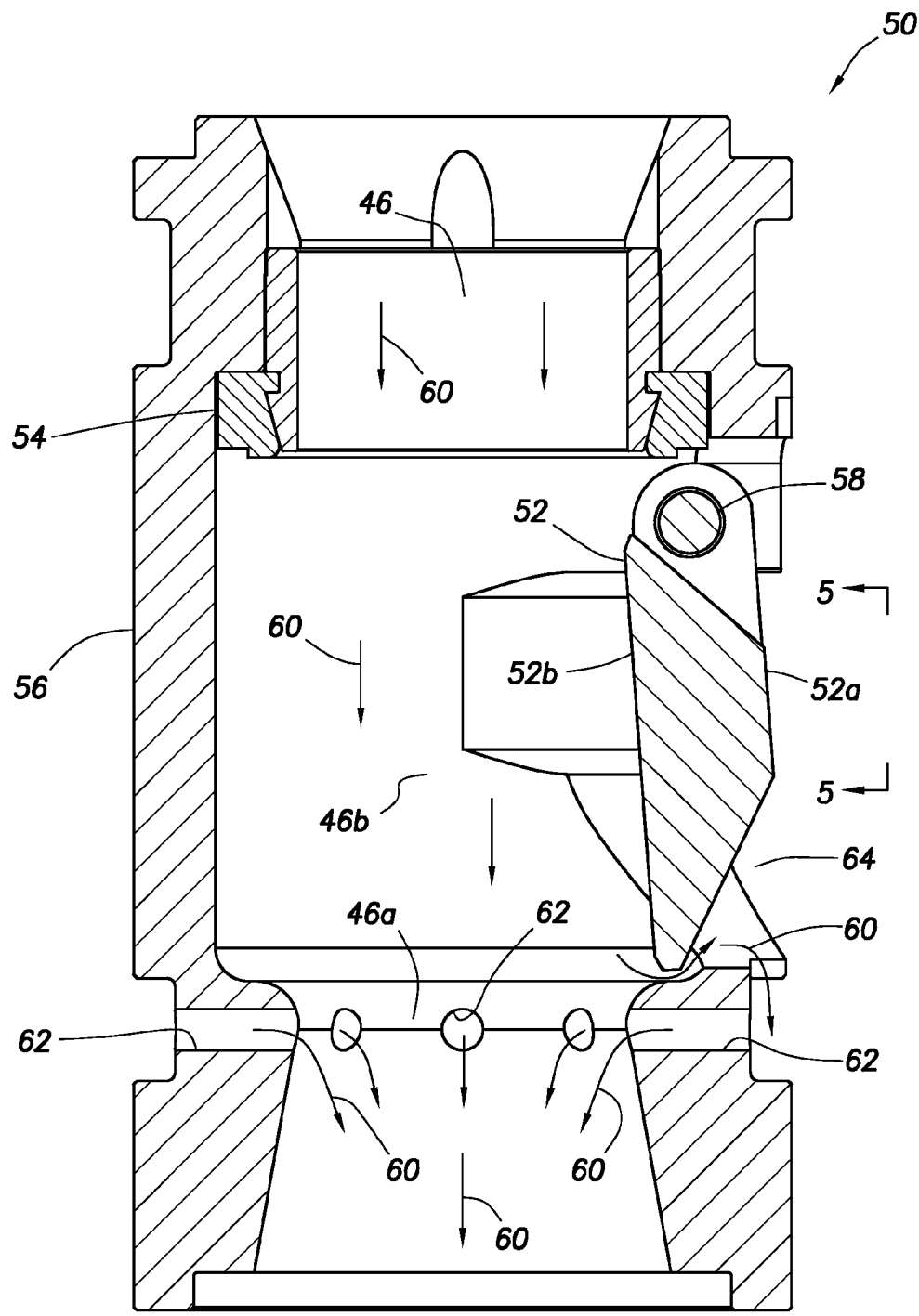
FIG. 4 is a representative cross-sectional view of the valve in an open configuration, taken along line 4-4 of FIG. 5.
Figure 5:
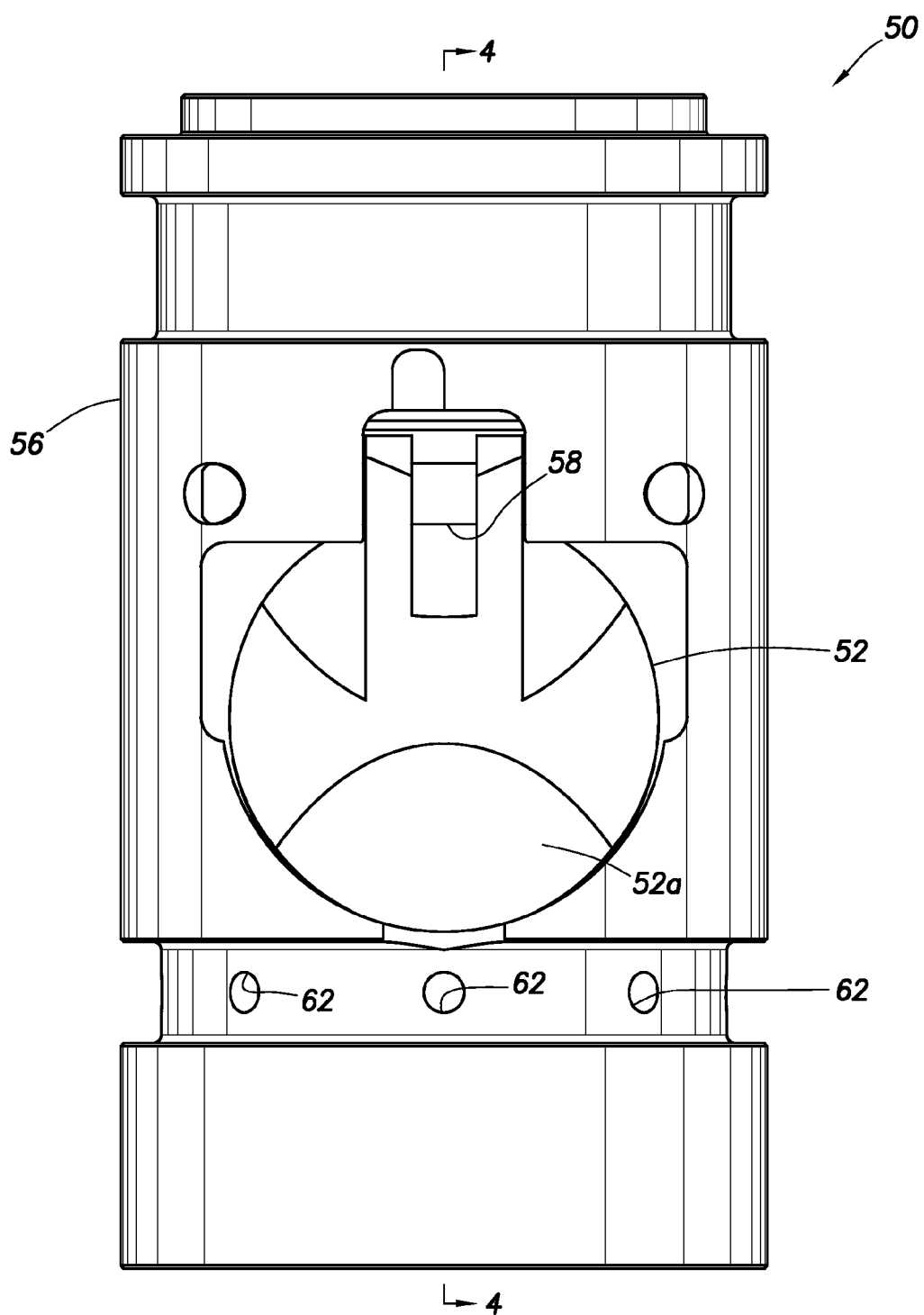
FIG. 5 is a side view of the valve, taken along line 5-5 of FIG. 4.

Referring additionally now to FIGS. 4 & 5, cross-sectional and side views of the valve 50 in an open configuration are representatively illustrated. In this configuration, fluid 60 flows through the passage 46 and, as described more fully below, the fluid flow acts to maintain the closure member 52 in its open position.

Note that a section 46a of the flow passage 46 downstream of the closure member 52 has a smaller flow area as compared to another section 46b of the flow passage directly adjacent the closure member. The reduced flow area flow passage section 46a acts as a venturi, increasing a velocity of the fluid 60 flowing through the section 46a, and thereby reducing pressure in the section 46a. In this manner, a pressure differential is created between the different longitudinal sections 46a,b of the flow passage 46.

Note, also, that with the closure member 52 in its open position, the closure member is disposed between the flow passage section 46b and a chamber 64 (the chamber is outwardly enclosed by the housing assembly 42, see FIG. 2). Ports 62 formed through the valve body 56 provide fluid communication between the flow passage section 46a and the chamber 64.

Thus, one side 52a of the closure member 52 is exposed to pressure in the chamber 64, and an opposite side 52b of the closure member is exposed to pressure in the flow passage section 46b. Since the chamber 64 is in communication with the flow passage section 46a, fluid pressure acting on the side 52a will be less than fluid pressure acting on the side 52b, and so the resulting pressure differential across the closure member 52 will act to bias the closure member toward its FIGS. 4 & 5 open position. The valve 50 can be appropriately configured so that the pressure differential across the closure member 52 is great enough to prevent any displacement of the closure member toward its closed position, while the fluid 60 flows through the passage 46.

In the FIGS. 4 & 5 example, the closure member 52 does not completely seal off the chamber 64 from the flow passage section 46b. Thus, since pressure in the chamber 64 is less than pressure in the flow passage section 46b, some of the fluid 60 can flow from the section 46b into the chamber 64, and thence via the ports 62 into the flow passage section 46a. However, in other examples the chamber 64 could be sealed off from the flow passage section 46b, if desired.

Figure 6:
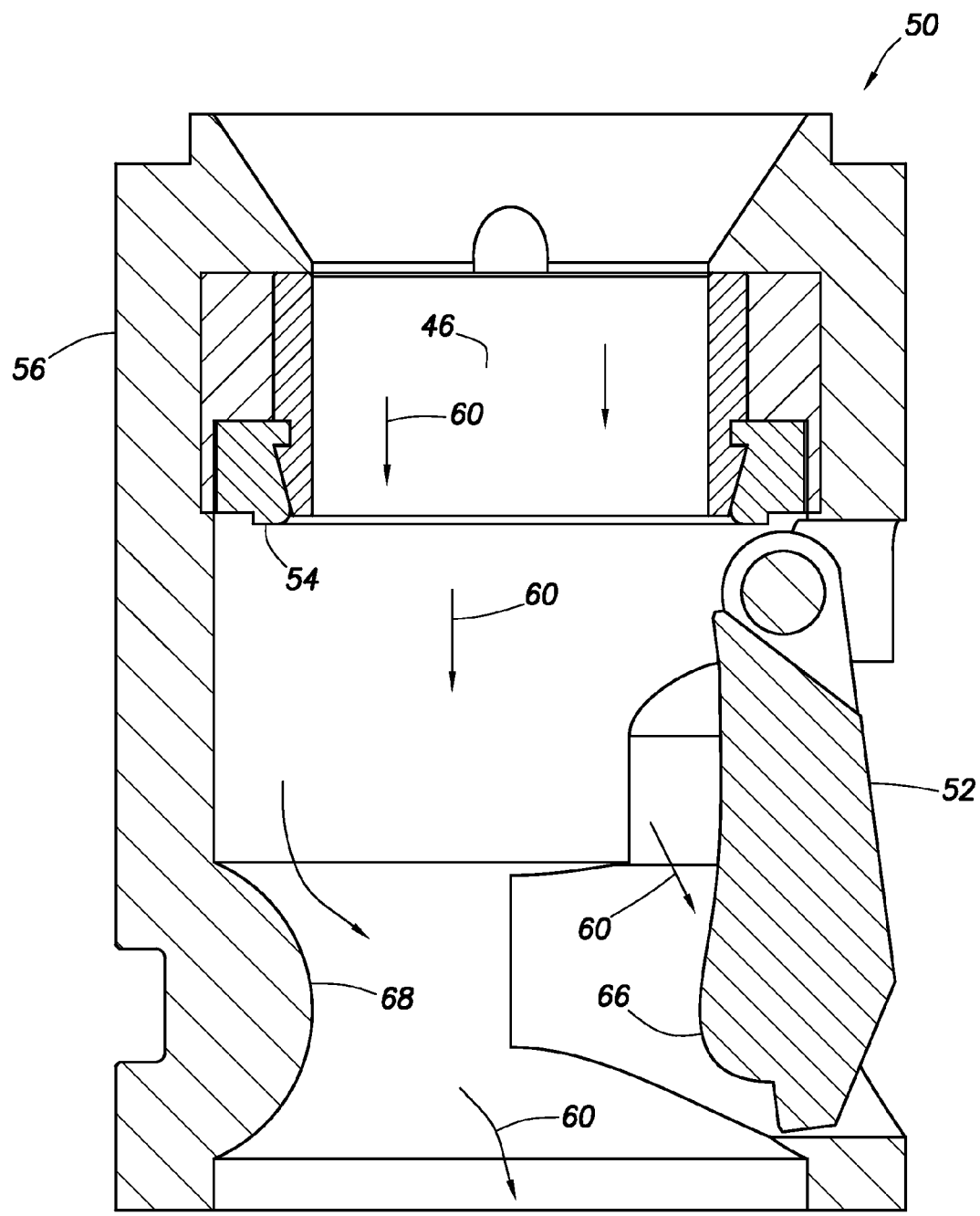
FIG. 6 is a representative cross-sectional view of another example of the valve.

Referring additionally now to FIG. 6, another example of the valve 50 is representatively illustrated in a cross-sectional view thereof. The FIG. 6 example may be used in substitution for, or in combination with, the example of FIGS. 3-5.

In the FIG. 6 example, fluid momentum is used to maintain the closure member 52 in its open position. The fluid 60 impinges on a projection 66 extending from the closure member 52 into the flow passage 46. This impingement prevents the closure member 52 from displacing toward its closed position, while the fluid 60 flows through the passage 46.

As depicted in FIG. 6, the projection 66 has a rounded shape, and is gradually sloped in an upstream direction. However, in other examples, other shapes (such as vanes, airfoils, bluff bodies, etc.) may be used as desired. In addition, other structures (such as a deflector 68 in the flow passage 46 that deflects the fluid 60 toward the closure member 52) may be used to enhance transfer of energy from the fluid to the closure member.

It may now be fully appreciated that the above disclosure provides significant advancements to the arts of constructing and operating fluid flow control valves. In examples described above, a closure member 52 is maintained in an open position, with displacement toward a closed position being prevented, while fluid 60 flows through a valve 50. By preventing displacement of the closure member 52 toward the closed position, reciprocation of the closure member between its open and closed positions is also prevented, thereby reducing or eliminating wear and damage to the valve 50.

More specifically, the above disclosure provides to the art a valve assembly 40 for use in a subterranean well. In one example, the valve assembly 40 includes a housing assembly 42 with tubular string connectors 44 at opposite ends of the housing assembly, a flow passage 46 extending longitudinally through the valve assembly 40, a first longitudinal section 46a of the flow passage having less flow area than a second longitudinal section 46b of the flow passage, and at least one valve 50 that permits flow in a first direction 34 through the flow passage 46 but prevents flow through the flow passage in a second direction 36 opposite to the first direction. The valve 50 includes a closure member 52. In an open position of the closure member 52, the closure member is disposed between the second flow passage section 46b and a chamber 64 in fluid communication with the first flow passage section 46a.

The closure member 52 may be maintained in the open position by a pressure differential between the first and second flow passage sections 46a,b. Displacement of the closure member 52 toward a closed position may be prevented by a pressure differential between the second flow passage section 46b and the chamber 64.

The valve assembly 40 can also include at least one port 62 extending through a body 56 of the valve 50. The port 62 may provide fluid communication between the first flow passage section 46a and the chamber 64.

The first flow passage section 46a may be downstream of the second flow passage section 46b with respect to flow in the first direction 34. In other examples, the first flow passage section 46a could be positioned upstream of the second flow passage section 46b.

Fluid 60 may flow from the second flow passage section 46b to the chamber 64, and from the chamber to the first flow passage section 46a.

The closure member 52 may comprise a flapper pivotably disposed relative to a valve seat 54.

Also provided to the art by the above disclosure is a method of operating a valve assembly 40 in a well. In one example, the method comprises: connecting the valve assembly 40 in a tubular string 12, the valve assembly including at least one valve 50 that permits flow in a first direction 34 through a longitudinal flow passage 46 of the valve assembly 40 but prevents flow in a second direction 36 opposite to the first direction; and flowing fluid 60 in the first direction 34 through the tubular string 12, thereby displacing a closure member 52 of the valve 50 to an open position and preventing displacement of the closure member toward a closed position.

The displacement preventing step can include producing a pressure differential across the closure member 52, the pressure differential preventing the closure member from displacing toward the closed position.

The closure member 52 displacing step may include disposing the closure member between the flow passage 46 and a chamber 64 of the valve 50, the pressure differential being produced from the flow passage to the chamber.

The valve 50 may include at least one port 62 that provides fluid communication between the chamber 64 and a venturi section 46a of the flow passage 46.

The displacement preventing step may comprise producing a pressure differential between separate longitudinal sections 46a,b of the flow passage 46.

The displacement preventing step may comprise the fluid 60 impinging on a projection 66 that extends from the closure member 52 into the flow passage 46 when the closure member is in the open position.

The closure member 52 may comprise a flapper, and the displacing step may comprise pivoting the flapper away from a valve seat 54.

The above disclosure also describes a well system 10. In one example, the well system 10 comprises a coiled tubing 20 string including a valve assembly 40 with at least one valve 50 that permits flow into a wellbore 14 via the coiled tubing string but prevents flow from the wellbore via the coiled tubing string. The valve 50 comprises a flapper (e.g., the closure member 52) having an open position in which the flow into the wellbore 14 is permitted through the valve. The flow into the wellbore 14 with the flapper in the open position produces a pressure differential across the flapper, and the pressure differential prevents displacement of the flapper toward a closed position.

The valve 50 can also include a flow passage 46 extending longitudinally through the valve, a first section 46a of the flow passage having a flow area that is less than a flow area of a second section 46b of the flow passage at the flapper in the open position. The first flow passage section 46a is in fluid communication with a flapper side 52a that faces away from the second flow passage section 46b with the flapper in the open position.

The flapper side 52a may be in fluid communication with the first flow passage section 46a via at least one port 62 extending through a body 56 of the valve 50.

Fluid 60 may flow from the second flow passage section 46b to a chamber 64 separated by the flapper from the second flow passage section, and from the chamber to the first flow passage section 46a. The chamber 64 may be in fluid communication with the first flow passage section 46a via at least one port 62 extending through a body 56 of the valve 50.

The valve 50 can include a projection 66 that extends from the flapper into the second flow passage section 46b with the flapper in the open position, whereby the flow into the wellbore 14 impinges on the projection and thereby prevents displacement of the flapper toward the closed position.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed (such as, the housing assembly 42 and the valve body 56 described above) can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of operating a valve assembly in a well, the method comprising:
    connecting the valve assembly in a tubular string, the valve assembly including at least one valve that permits flow in a first direction through a longitudinal flow passage of the valve assembly but prevents flow in a second direction opposite to the first direction;
    flowing fluid in the first direction through the tubular string, thereby displacing a closure member of the valve to an open position;
    increasing a velocity of the fluid through a first section of the longitudinal flow passage, thereby creating a reduced pressure in the first section; and
    exposing a side of the closure member to the reduced pressure, thereby preventing displacement of the closure member toward a closed position, the exposing comprising communicating the reduced pressure to the side of the closure member via at least one port substantially isolated from the flow passage between the flow passage first section and the side of the closure member.

2. The method of claim 1, wherein the displacement preventing comprises producing a pressure differential across the closure member, the pressure differential preventing the closure member from displacing toward the closed position.

3. The method of claim 2, wherein the closure member displacing comprises disposing the closure member between the flow passage and a chamber of the valve, the pressure differential being produced from the flow passage to the chamber.

4. The method of claim 3, wherein the port provides fluid communication between the chamber and the first section of the flow passage.

5. The method of claim 1, wherein the displacement preventing comprises producing a pressure differential between the first section and a second section of the flow passage.

6. The method of claim 1, wherein the displacement preventing comprises the fluid impinging on a projection that extends from the closure member into the flow passage when the closure member is in the open position.

7. The method of claim 1, wherein the closure member comprises a flapper, and wherein the displacing comprises pivoting the flapper away from a valve seat.

8. A well system, comprising:
    a coiled tubing string including a valve assembly with at least one valve that permits flow into a wellbore via the coiled tubing string but prevents flow from the wellbore via the coiled tubing string,
    wherein the valve comprises a flapper having an open position in which the flow into the wellbore is permitted through a flow passage of the valve, wherein the flow into the wellbore with the flapper in the open position creates a reduced pressure which is transmitted to a side of the flapper via a flow path formed radially between a body of the valve and a housing of the valve assembly, thereby producing a pressure differential across the flapper, wherein the pressure differential prevents displacement of the flapper toward a closed position, and wherein at least one port communicates the reduced pressure from the flow passage to the flow path, the port being isolated from the flow passage between the flow path and the flow passage.

9. The well system of claim 8, wherein a first section of the flow passage has a flow area that is less than a flow area of a second section of the flow passage at the flapper in the open position, and wherein the first flow passage section is in fluid communication with the flapper side that faces away from the second flow passage section with the flapper in the open position.

10. The well system of claim 9, wherein the port extends through the body of the valve.

11. The well system of claim 9, wherein fluid flows from the second flow passage section to a chamber separated by the flapper from the second flow passage section, and from the chamber to the first flow passage section.

12. The well system of claim 11, wherein the chamber is in fluid communication with the first flow passage section via the port extending through the body of the valve.

13. The well system of claim 9, wherein the valve further comprises a projection that extends from the flapper into the second flow passage section with the flapper in the open position, whereby the flow into the wellbore impinges on the projection and thereby prevents displacement of the flapper toward the closed position.

* * * * *

UNITED STATES PATENT AND TRADEMARK OFFICE
CERTIFICATE OF CORRECTION

PATENT NO. : 9,752,410 B2  
APPLICATION NO. : 14/871060  
DATED : September 5, 2017  
INVENTOR(S) : Aaron D. Holmberg and Roger L. Schultz Page 1 of 1

It is certified that error appears in the above-identified patent and that said Letters Patent is hereby corrected as shown below:

On the Title Page

Insert the following Item (30), Foreign Priority Data, in the left-hand column, immediately after Item (22):

--(30) Foreign Application Priority Data  
February 6, 2015     (WO) ........................ PCT/US15/14877--

Signed and Sealed this  
Twenty-fourth Day of July, 2018

Andrei Iancu  
*Director of the United States Patent and Trademark Office*